United States Patent
Gouch et al.

(10) Patent No.: US 12,189,111 B2
(45) Date of Patent: Jan. 7, 2025

(54) METHOD OF PREPARING A STAGE FOR USE IN A SLIDE IMAGING APPARATUS

(71) Applicant: VENTANA MEDICAL SYSTEMS, INC., Tucson, AZ (US)

(72) Inventors: Martin Philip Gouch, Hertfordshire (GB); Jagdish Pankhania, Harrow (GB)

(73) Assignee: VENTANA MEDICAL SYSTEMS, INC., Tucson, AZ (US)

(*) Notice: Subject to any disclaimer, the term of this patent is extended or adjusted under 35 U.S.C. 154(b) by 501 days.

(21) Appl. No.: 17/523,453

(22) Filed: Nov. 10, 2021

(65) Prior Publication Data

US 2022/0066191 A1 Mar. 3, 2022

Related U.S. Application Data

(63) Continuation of application No. 16/477,837, filed as application No. PCT/EP2018/050568 on Jan. 10, 2018, now Pat. No. 11,187,882.

(30) Foreign Application Priority Data

Jan. 13, 2017 (EP) .................................... 17151356

(51) Int. Cl.
*G02B 21/26* (2006.01)
*G02B 21/34* (2006.01)
*G02B 21/36* (2006.01)

(52) U.S. Cl.
CPC ............. *G02B 21/34* (2013.01); *G02B 21/26* (2013.01); *G02B 21/36* (2013.01)

(58) Field of Classification Search
CPC ........ G02B 21/21; G02B 21/24; G02B 21/26; G02B 21/34; G02B 21/36; G02B 21/241;
(Continued)

(56) References Cited

U.S. PATENT DOCUMENTS

| | | |
|---|---|---|
| 6,522,774 B1 | 2/2003 | Bacus et al. |
| 6,640,014 B1 | 10/2003 | Price et al. |
| 6,711,283 B1 | 3/2004 | Soenksen |
| 7,485,834 B2 | 2/2009 | Gouch |

(Continued)

FOREIGN PATENT DOCUMENTS

| | | | |
|---|---|---|---|
| CN | 103543165 A | * | 1/2014 |
| EP | 0245089 A2 | | 11/1987 |

(Continued)

OTHER PUBLICATIONS

U.S. Appl. No. 16/477,837, Notice of Allowance mailed on Jul. 30, 2021, 14 pages.

(Continued)

*Primary Examiner* — Mustak Choudhury
(74) *Attorney, Agent, or Firm* — Kilpatrick Townsend & Stockton LLP

(57) ABSTRACT

A method of preparing a stage for use in a slide imaging apparatus including positioning a stage in relation to a flat surface so that the flat surface is positioned in front of the top surfaces of slide support pin bases on the top surface of the stage. The method also includes injecting a fluid pin surfacing material configured to solidify into the hole of each slide support pin base so that at least some of the fluid pin surfacing material exits the hole at the top surface of the slide support pin bases and pushes up against the flat surface. The method also includes removing the flat surface so that a tip of solid pin surfacing material is formed on the top surface of each slide support pin base, thereby providing the stage with a plurality of slide support pins.

19 Claims, 13 Drawing Sheets

(58) Field of Classification Search
CPC ............ G02B 21/248; G01N 1/286; G01N 2035/00138; H01J 37/20; H01J 37/26; H01J 37/18; H01J 37/185
See application file for complete search history.

(56) References Cited

U.S. PATENT DOCUMENTS

| | | |
|---|---|---|
| 8,712,116 B2 | 4/2014 | Gouch |
| 9,116,035 B2 | 8/2015 | Gouch et al. |
| 11,187,882 B2 | 11/2021 | Gouch et al. |
| 2002/0102213 A1* | 8/2002 | Sutoo ............... G01N 33/582 382/128 |
| 2008/0310015 A1 | 12/2008 | Pfeifer |
| 2014/0071438 A1 | 3/2014 | Gouch et al. |
| 2015/0177504 A1* | 6/2015 | Bickert ............... G02B 21/34 348/80 |

FOREIGN PATENT DOCUMENTS

| | | | |
|---|---|---|---|
| EP | 0534247 | 3/1993 | |
| JP | 6577699 B2 * | 9/2019 | ....... G01N 35/00029 |
| WO | 2013017855 | 2/2013 | |

OTHER PUBLICATIONS

International Application No. PCT/EP2018/050568, International Preliminary Report on Patentability mailed on Jul. 25, 2019, 7 pages.
How to Measure Friction? Available online at http://www.tribology-abc.com/abc/friction.Htm, Accessed from Internet on Jun. 10, 2022, pp. 1-2.
International Search Report and Written Opinion dated Mar. 29, 2018 connection with PCT/EP2018/050568, filed Jan. 2018.

* cited by examiner

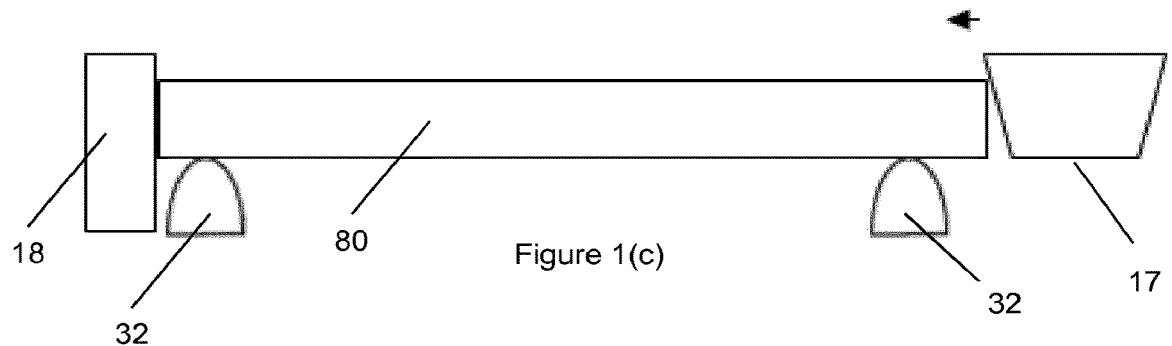
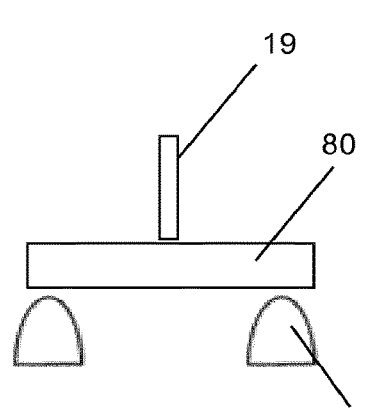
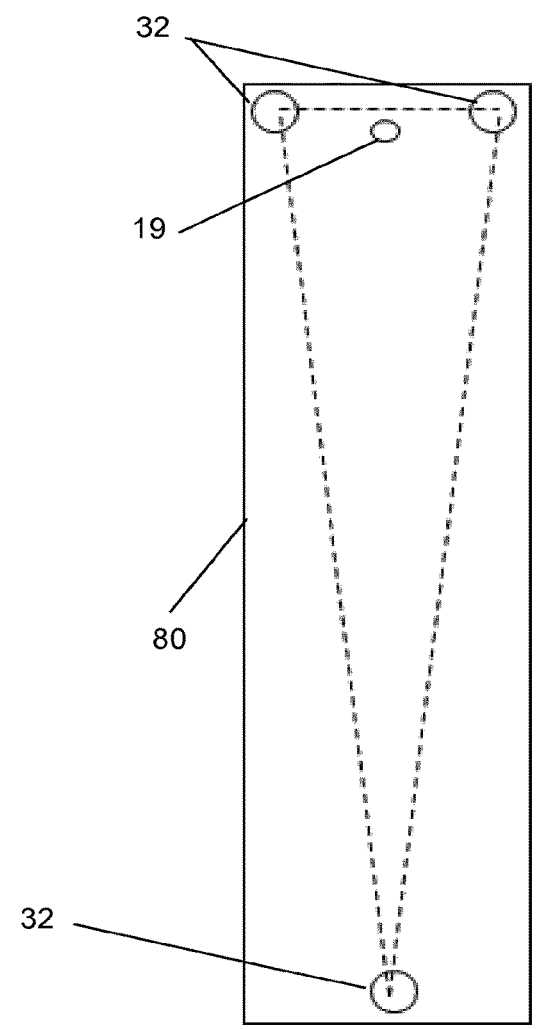

METHOD OF PREPARING A STAGE FOR USE IN A SLIDE IMAGING APPARATUS

FIELD OF THE INVENTION

This invention relates to a method of preparing a stage for use in a slide imaging apparatus, e.g. for use in digital pathology.

BACKGROUND

A slide imaging apparatus is an imaging apparatus configured to form an image of a sample mounted on a slide. The image formed by modern slide imaging apparatuses is typically a digital image, and such an image may therefore be referred to as a "digital slide". Typically, the sample mounted on the slide is a biological specimen, such as a tissue sample. Typically the slide is a glass slide.

Typically, a slide imaging apparatus is used in digital pathology, which can be understood as an image-based information environment that allows for the management of information generated from a digital slide Where a slide imaging apparatus is capable of forming an image covering the majority if not all the surface of a slide, e.g. through a scanning process, the slide imaging apparatus may be referred to as a "whole slide imaging" apparatus.

A slide imaging apparatus may use a 2D camera or a line scan detector to form the image of a sample mounted on a slide.

Examples of slide imaging apparatuses are described in U.S. Pat. No. 6,522,774, EP00534247B1, U.S. Pat. Nos. 6,640,014 B1, 6,711,283 B1, 9,116,035, WO2013017855 and U.S. Pat. No. 8,712,116, for example.

FIG. 1(a) shows an example imaging system 10 for use in a slide imaging apparatus. The imaging system 10 of FIG. 1(a) includes a line scan detector 14 and operates according to known principles.

In more detail, the imaging system 10 of FIG. 1(a) includes an imaging lens 12 configured to focus light originating from a sample mounted on a slide 80 onto the line scan detector 14. The line scan detector 14 typically includes a linear array of pixels.

In the imaging system 10, the line scan detector 14 is configured to acquire 1D image data from an elongate region 82 of the sample that extends along a swathe width axis (x-axis). The swathe width axis is perpendicular to a scan length axis (y-axis).

FIG. 1(b) shows an example copy holder moving system 20 for use with the imaging system 10 of FIG. 1(a) in a slide imaging apparatus.

The copy holder moving system 20 includes a movable stage 30 and a copy holder 60. The movable stage 30 is configured to be moved along the scan length axis (y-axis) and the swathe width axis (x-axis). The copy holder 60 is configured to be mounted to the movable stage 30. The copy holder 60 includes a plurality of apertures in the form of slots 62, each slot 62 being configured to loosely hold a respective slide 80. A top surface 30a of the movable stage 30 includes a plurality of metal slide support pins 32 (not visible in FIG. 1(b)) located so that when the copy holder 60 is mounted on the movable stage 30, the/each slide 80 loosely held by a slot 62 on the copy holder 60 is supported by three metal slide support pins 32.

It is preferred that top surfaces of the metal slide support pins 32 which contact the slides 80 are coplanar so that the imaging system 10 is able to more easily retain focus of samples mounted on the slides 80 supported by the slide support pins 32 whilst it is moved by the moveable stage 30.

In use, the copy holder 60 holding a plurality of slides 80 is mounted to the movable stage 30. The movable stage 30, and therefore each slide 80 held by the copy holder 60 mounted to the movable stage 30, is moved along the scan length axis (y-axis) and along the swathe width axis (x-axis) so that the imaging system is able to form an image of a sample mounted on each slide 80.

In more detail, the imaging system 10 is configured to form an image of a respective sample mounted on each slide 80 in a plurality of swathes, wherein each swathe is formed by a group of scan lines, each scan line being acquired using the scan line detector 14 from a respective elongate region 82 on the surface of the sample that extends along the swathe width axis, wherein each group of scan lines is acquired whilst the slide 80 is moved relative to the scan line detector 14 along the scan length axis (y-axis), e.g. in the direction labelled 16 in FIG. 1(a), using the copy holder moving system 20. After one swathe has been acquired, the slide 80 is moved along the swathe width axis (x-axis), e.g. in the direction labelled 15 in FIG. 1(a), to allow a further swathe to be acquired by moving the slide 80 along the scan length axis (y-axis). This further swathe may be acquired by moving the slide 80 along the scan length axis in a direction opposite to the direction labelled 16 in FIG. 1(a), e.g. such that the slide 80 is moved along a serpentine path during the image forming process.

Typically, an individual swathe acquired from a sample mounted on a slide 80 may, at the surface of the slide 80, e.g. be approximately 1 mm wide along the swathe width axis (x-axis) and between 2 mm and 60 mm long along the scan length direction (y-axis). Multiple swathes can be combined to generate an image wider than the (e.g. approximately 1 mm) width of an individual swathe.

A focus setting of the imaging system 10 of FIG. 1(a) may be adjusted, for example, by moving the imaging lens 12 along an imaging axis 13. Imperfections in the slide support pins 32, imperfections in a slide 80 resting on the slide support pins 32, or an uneven sample mounted on the slide 80, can cause loss of focus whilst a digital image of the sample is being acquired. Therefore, during the acquisition of a swathe, a focus setting of the imaging system 10 can be dynamically adjusted to maintain the sample in focus along the length of the sample along the scan length axis (y-axis). Techniques suitable for measuring and dynamically adjusting a focus setting of the imaging system 10 to maintain the sample in focus along the length of the sample as the slide 80 is moved along the scan length axis are described in the literature, see e.g. U.S. Pat. No. 7,485,834, WO2013/017855 and US2014/0071438.

An example slide imaging apparatus implementing the principles described above with reference to FIG. 1(a) and FIG. 1(b) is the SCN400 slide scanner marketed by Leica™. A video describing the operation of the SCN400 slide scanner can be found at https://www.youtube.com/watch?v=hrIUI8HU8xE.

The present inventors have observed some challenges with a slide imaging apparatus implementing the principles described above with reference to FIG. 1(a) and FIG. 1(b).

For example, the present inventors have observed that the top surfaces of the slide support pins 32 formed on the top surface 30a of the movable stage 30 are typically metal, to allow them to be precision manufactured to be coplanar. But this creates a problem, because fast movement of the movable stage 30 may cause a slide 80 resting on the slide support pins 32 to slip thereby creating a discontinuity in the image being formed. Previously, the inventors have addressed this problem by accelerating the movable stage 30 slowly enough to avoid the slide 80 slipping on the slide support pins 32.

In some slide imaging apparatuses, this problem has instead been addressed by using a mechanism for applying downwards pressure on the slide 80 so as to push it onto the slide support pins 32, thereby preventing the slide 80 from slipping relative to the slide support pins 32.

One such mechanism is the use of a wedged lever 17 which comes in from the side and pushes up against a stop 18, as illustrated diagrammatically in FIG. 1(*c*). However, this mechanism tends to tip the slide 80 up as the centre of the downwards force does not pass through the space between the slide support pins 32 and the point contact of the wedged lever 17 can damage the slide 80.

Another such mechanism is the use of a downwardly extending pin 19 which contacts a top surface of the slide 80 within a triangle defined by the points of contact of three slide support pins 32, as illustrated diagrammatically in FIGS. 1(*d*) and 1(*e*). However, whilst this mechanism ensures the slide 80 sits on the slide support pins 32 it obscures an area of the slide 80 so it cannot be imaged.

The present invention has been devised in light of the above considerations.

SUMMARY OF THE INVENTION

A first aspect of the invention may provide a method of preparing a stage for use in a slide imaging apparatus, the method including:
- providing a stage having a top surface and a bottom surface, wherein the top surface of the stage includes a plurality of slide support pin bases, and wherein each slide support pin base includes a respective hole that extends from a top surface of the slide support pin base through to the bottom surface of the stage;
- positioning the stage in relation to a flat surface so that the flat surface is positioned in front of the top surfaces of the slide support pin bases, with a gap between the top surface of each slide support pin base and the flat surface;
- for each slide support pin base, injecting a fluid pin surfacing material configured to solidify into the hole of the slide support pin base from the bottom surface of the stage so that at least some of the fluid pin surfacing material exits the hole at the top surface of the slide support pin base and pushes up against the flat surface; and
- after the fluid pin surfacing material injected into the hole of each slide support pin base has solidified, removing the flat surface so that a tip of solid pin surfacing material is formed on the top surface of each slide support pin base, thereby providing the stage with a plurality of slide support pins, each slide support pin including a respective slide support pin base and a tip of solid pin surfacing material.

Because the tips of the slide support pins were formed by solidified pin surfacing material that pushed up against flat surface, the tips can replicate the flat surface and are therefore able to have coplanar top surfaces configured to support one or more slides. Therefore, the above-described method provides a convenient way to provide slide support pins with coplanar top surfaces, without requiring the precision manufacturing of metal as described in the background section, above.

The solid pin surfacing material may have a coefficient of static friction relative to glass of 0.2 or higher, more preferably 0.3 or higher, more preferably 0.4 or higher. Such coefficients can be achieved e.g. by a cured epoxy resin (which would typically have a coefficient of static friction relative to glass of 0.44).

In contrast, a typical metal conventionally used to provide slide support pins may have a coefficient of friction relative to glass of just 0.13.

In this way, the tips of the slide support pins can be provided by a material that provides enhanced friction with glass compared with conventional metal slide support pins as described in the background section, above. Thus, if the stage is used as a movable stage in a slide imaging apparatus, the movable stage can be accelerated more quickly without a slide resting on the slide support pins slipping, compared with metal slide support pins. This allows for images of samples mounted on the slides to be formed faster and with a shorter distance of travel as the increased acceleration permits shorter run up and deceleration distances and times.

The coefficient of static friction of the solid pin surfacing material relative to glass may be calculated according to an international standard, such as ISO 15113:2005, ISO 21182: 2013 or ASTM D1894-14, or via another published method such as method 2 (spring balance) or method 3 (tilted plane) disclosed at http://www.tribology-abc.com/abc/friction.htm.

The glass used in calculating the coefficient of static friction of the solid pin surfacing material relative to glass may be a glass used in a pathology slide, e.g. a soda lime glass such as 0215 Corning. Although most slides are made of soda lime glass, other optically transparent material such as acrylic or quartz may also be used.

The solid pin surfacing material may have a hardness of 40 or more, preferably 60 or more, more preferably 70 or more, optionally 80 or more, on the Shore A hardness scale. This is thought by the inventors to be adequately hard to avoid potentially problematic levels of deformation of the slide support pins when the slide support pins are used with typical pathology glass slides, which typically weigh around 7 g.

Typically, the choice of solid pin surfacing material would be an engineering balance between a desire for a high coefficient of static friction and an adequate level of hardness. The method according to the first aspect of the invention allows a superior balance to be achieved because it enables the use of softer more frictional materials to produce a well-defined pin surface, without requiring the use of machining which generally requires harder materials which naturally have lower coefficients of friction.

A typical metal conventionally used to provide slide support pins (which may typically have a hardness of e.g. 400 on the Vickers hardness scale) would typically be much harder than a typical polymer as may be used as the solid pin surfacing material such as a cured epoxy resin (which may typically have a hardness of e.g. 80 on the Shore A harness scale—harder than a typical car tyre). However, as noted above, a hardness of 40 or more on the Shore A hardness scale is thought to be adequately hard to avoid potentially problematic levels of deformation of the slide support pins when the slide support pins are used with typical pathology glass slides.

The hardness of the solid pin surfacing material on the Shore A scale may be measured according to a standard such as ASTM D2240.

Equipment for measuring Shore A hardness (and indeed Vickers hardness) is widely available.

The fluid pin surfacing material may be configured to solidify either by waiting for it to solidify, or by taking some action to promote or cause solidification of the fluid pin surfacing material. This action may include heating, for example.

Accordingly, the method may include a curing step during which the fluid pin surfacing material solidifies into the solid pin surfacing material. The curing step may include simply waiting for the fluid pin surfacing material to harden, or may include some action to promote or cause solidification of the fluid pin surfacing material. This action may include heating, for example.

The solid pin surfacing material may include a polymer, e.g. as would be the case if the solid pin surfacing material includes a cured epoxy resin (see below).

The fluid pin surfacing material may include an epoxy resin, in which case the solid pin surfacing material may include a cured epoxy resin.

Epoxy resins are thought by the inventors to provide desirable friction properties with respect to glass and desirable hardness properties for use in slide support pins. Epoxy resins having friction and hardness properties as defined above (e.g. a coefficient of static friction relative to glass of 0.4 or higher and a hardness of 40 or more on the Shore A hardness scale) are commercially available.

As is known in the art, an epoxy resin may be cured by reacting the epoxy resin with itself or by forming a copolymer with a curative or hardener. Thus, the fluid pin surfacing material may include an epoxy resin mixed with a curative or hardener which acts to cure the epoxy resin.

The flat surface may be covered by a release agent before the fluid pin surfacing material is injected into the hole of the slide support pin bases (i.e. before the fluid pin surfacing material pushes up against the flat surface). The release agent may be a very thin layer of material, e.g. oil or grease, configured to prevent/impede the fluid pin surfacing material (which may e.g. include an epoxy resin) from adhering to the flat surface.

A pin tip forming tool may be located between the top surface of the stage and the flat surface during injection of fluid pin surfacing material into the holes of the slide support pin bases, wherein the pin tip forming tool has a plurality of apertures, with each aperture in the pin tip forming tool being configured (e.g. by being appropriately located and shaped) to confine fluid pin surfacing material exiting the hole at the top surface of a respective slide support pin base.

During injection of the fluid pin surfacing material into the hole of each slide support pin base, some fluid pin surfacing material may be left to overlap an outer edge of the hole in the slide support pin base at the bottom surface of the stage so that, after the fluid pin surfacing material has solidified, there is a securing element of solid pin surfacing material that overlaps the outer edge of the hole in the slide support pin base at the bottom surface of the stage.

This securing element is useful because it may act to hold the corresponding tip of solid pin surfacing material in place on the top surface of the corresponding slide support pin base.

The flat surface may be provided by a surface plate, for example. The surface plate may be made of steel, e.g. tool plate steel.

A second aspect of the invention may provide a stage that has been prepared by a method according to the first aspect of the invention.

A third aspect of the invention may provide a slide imaging apparatus that includes:
a copy holder moving system; and
an imaging system;
wherein the copy holder moving system includes:
a movable stage prepared by a method according to the first aspect of the invention, wherein the movable stage is configured to move along first and second slide movement axes relative to the imaging system, wherein a top surface of the movable stage includes the plurality of slide support pins which are configured to support one or more slides in one or more imaging locations on the movable stage, wherein the imaging system is configured to form an image of a sample mounted on a slide located in the/each imaging location on the movable stage during an image forming process that includes the movable stage moving relative to the imaging system along the first and second slide movement axes;
a copy holder configured to be mounted to the movable stage, wherein the copy holder includes a plurality of apertures, each aperture being configured to hold a respective slide;
wherein the copy holder is configured to be mounted to the movable stage in a position defined such that at least a subset of the slides held by the copy holder are supported in the one or more imaging positions by the slide support pins.

The copy holder may be configured to be mounted to the movable stage in each of a plurality of indexing positions that include at least a first indexing position and a second indexing position defined such that:
when the copy holder is mounted to the movable stage in the first indexing position, a first subset of the slides held by the copy holder are supported in the one or more imaging positions by the slide support pins;
when the copy holder is mounted to the movable stage in the second indexing position, a second subset of the slides held by the copy holder are supported in the one or more imaging positions by the slide support pins.

The terms "copy holder", "holder" and "slide holder" may be used interchangeably herein. Thus, instances of the term "copy holder" may be replaced with "holder" or "slide holder" herein.

The invention also includes any combination of the aspects and preferred features described except where such a combination is clearly impermissible or expressly avoided.

For avoidance of any doubt, the use of the adjectives "top" and "bottom" in connection with an object may reflect an intended/preferred orientation when the object is used in a slide imaging apparatus, and should not be interpreted to require a specific orientation of that object at all times, unless this is explicitly stated. The adjectives "top" and "bottom" may therefore be replaced with the terms "first" and "second".

BRIEF DESCRIPTION OF THE DRAWINGS

Examples of these proposals are discussed below, with reference to the accompanying drawings in which:

FIG. 1(c) shows a first example mechanism for applying downwards pressure on a slide so as to push it onto slide support pins.

FIGS. 1(d) and 1(e) show a second example mechanism for applying downwards pressure on a slide so as to push it onto slide support pins.

DETAILED DESCRIPTION

Figure 2:
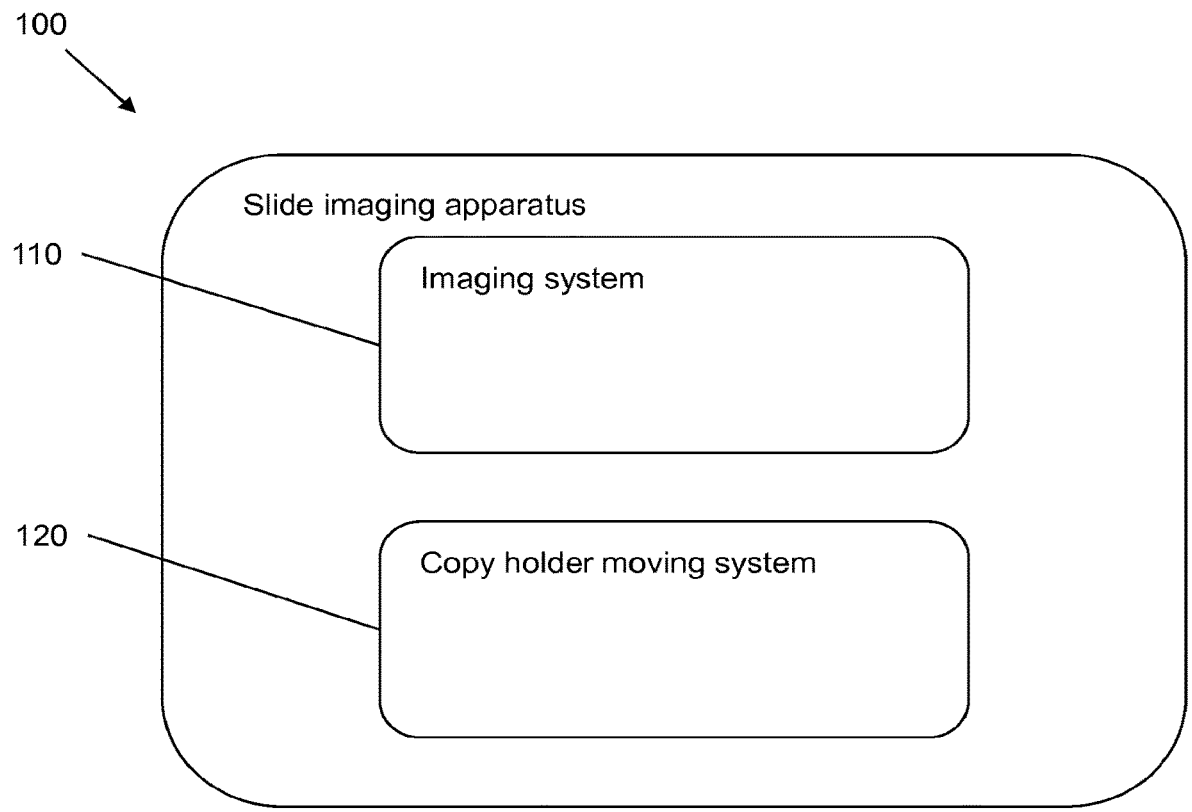
FIG. 2. shows an example slide imaging apparatus that includes an imaging system and a copy holder moving system.

FIG. 2. shows an example slide imaging apparatus 100 that includes an imaging system 110 and a copy holder moving system 120.

Figure 1A:
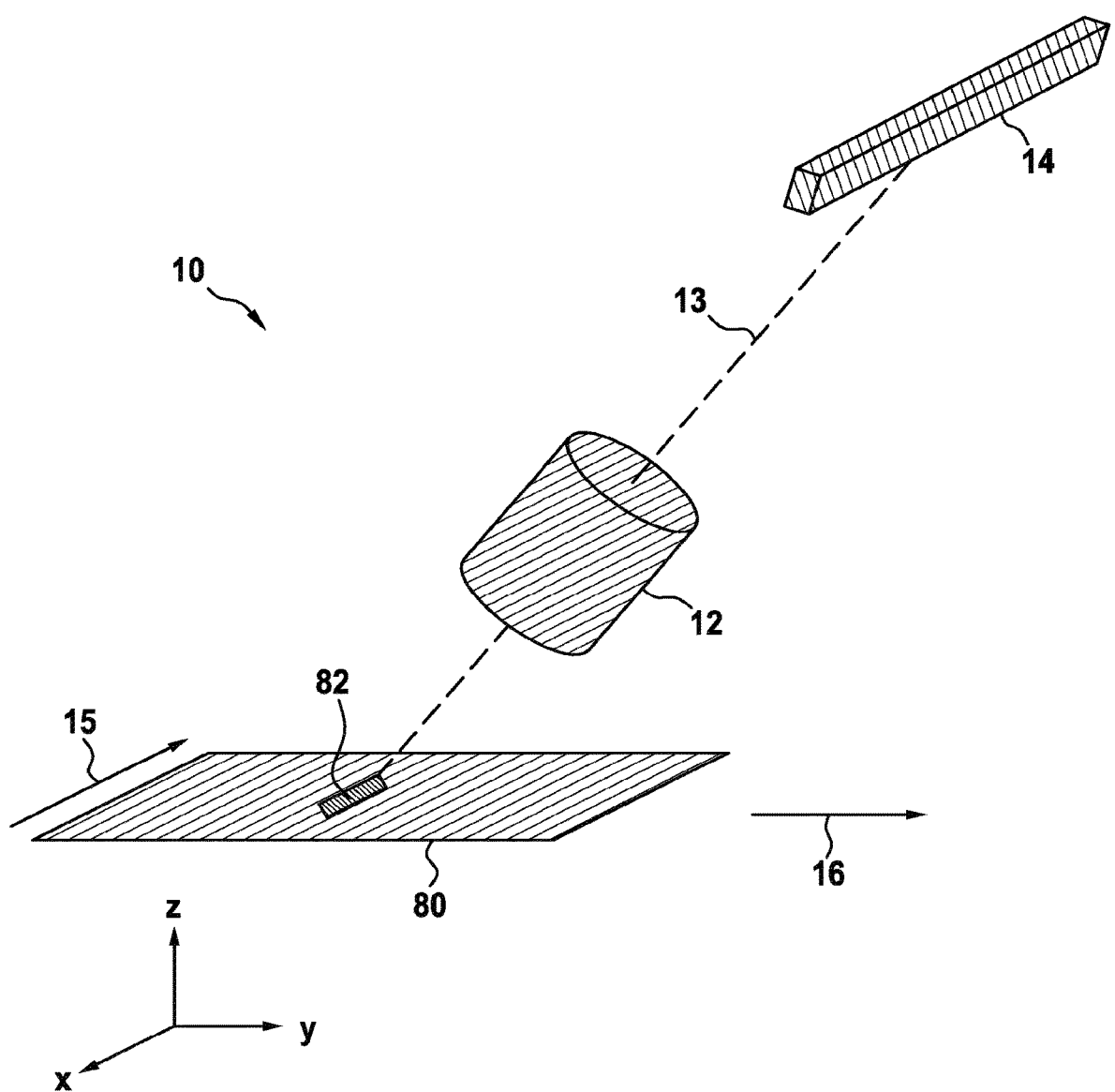
FIG. 1(a) shows an example imaging system for use in a slide imaging apparatus.
Figure 1B:
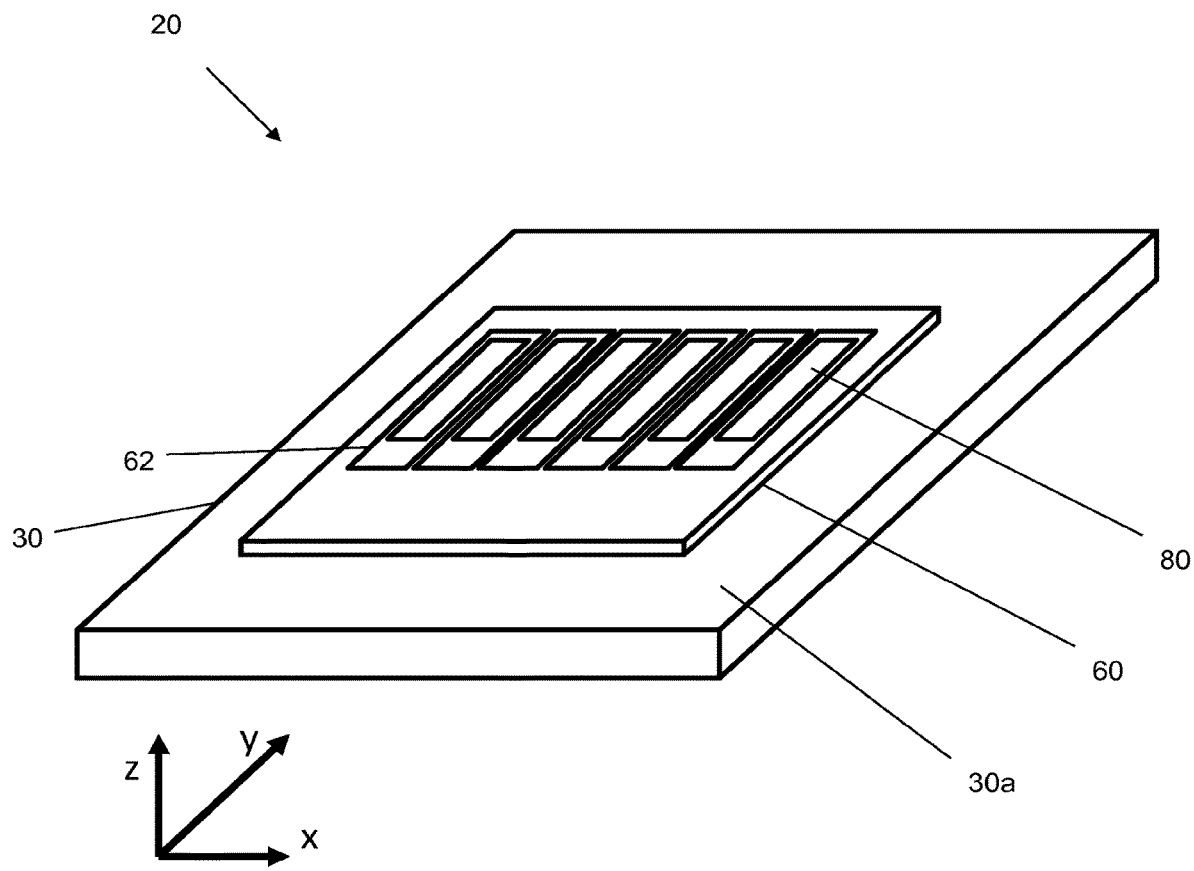
FIG. 1(b) shows an example copy holder moving system for use with the imaging system of FIG. 1(a) in a slide imaging apparatus.

The imaging system 110 may be the same as the imaging system 10 shown in FIG. 1(a), for example.

FIGS. 3(a)-(h) show the copy holder moving system 120 of FIG. 2 in more detail.

As shown in FIGS. 3(a)-(g), the copy holder moving system 120 includes a movable stage 130 and a copy holder 150.

Although the movable stage 130 is not an embodiment of the present invention, it is useful for understanding the present invention.

For clarity, FIGS. 3(a)-(f) and 3(h) show the copy holder moving system 120 without slides 80 being held by the copy holder 150.

Figure 3A:
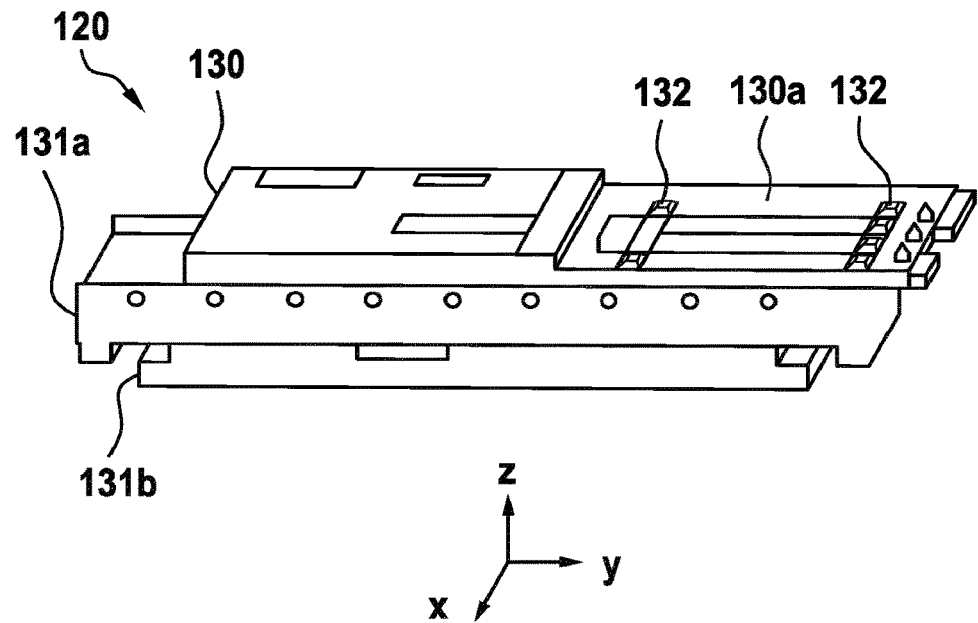
FIGS. 3(a)-(h) show the copy holder moving system of FIG. 2 in more detail.
Figure 3B:
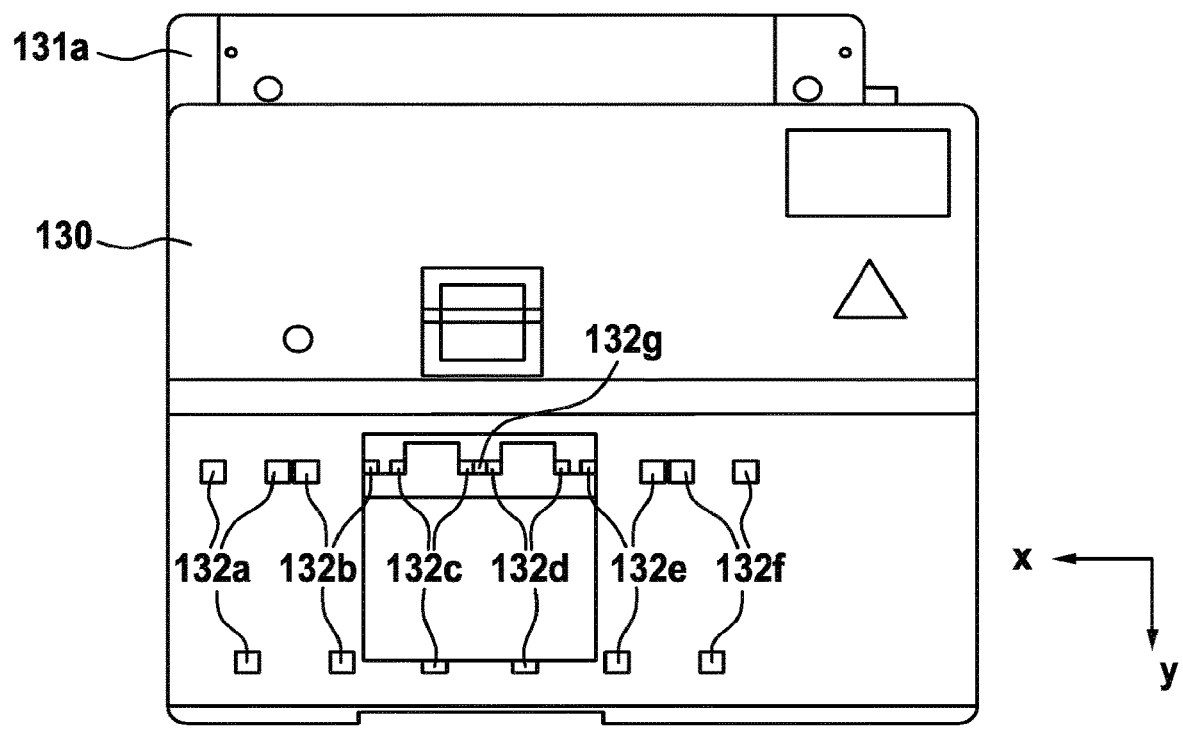
Figure 3C:
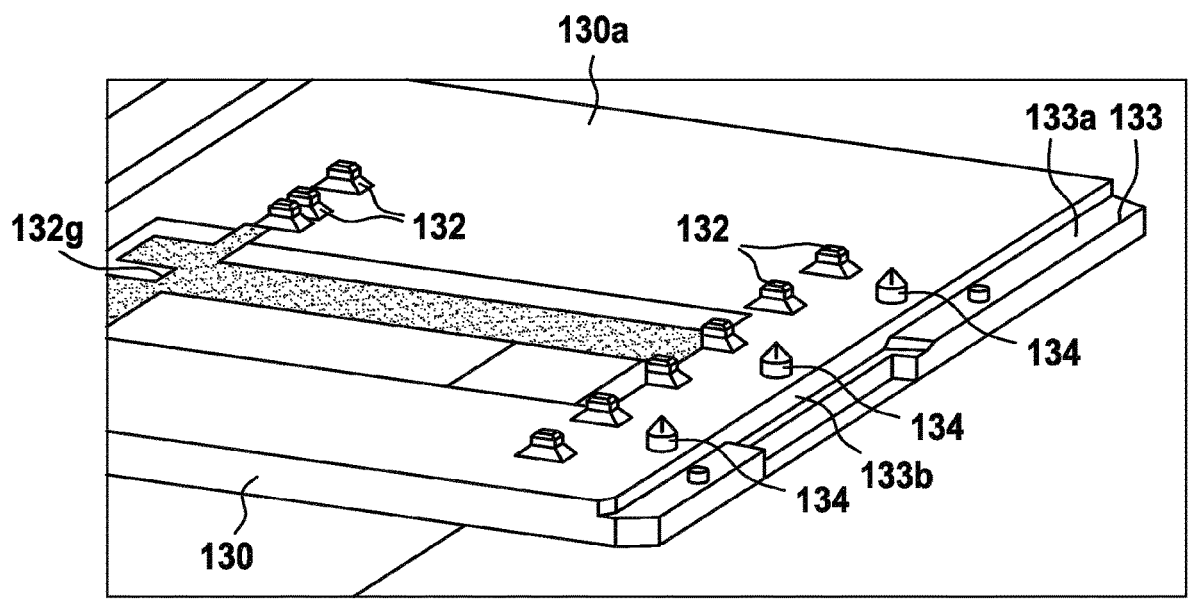
Figure 3D:
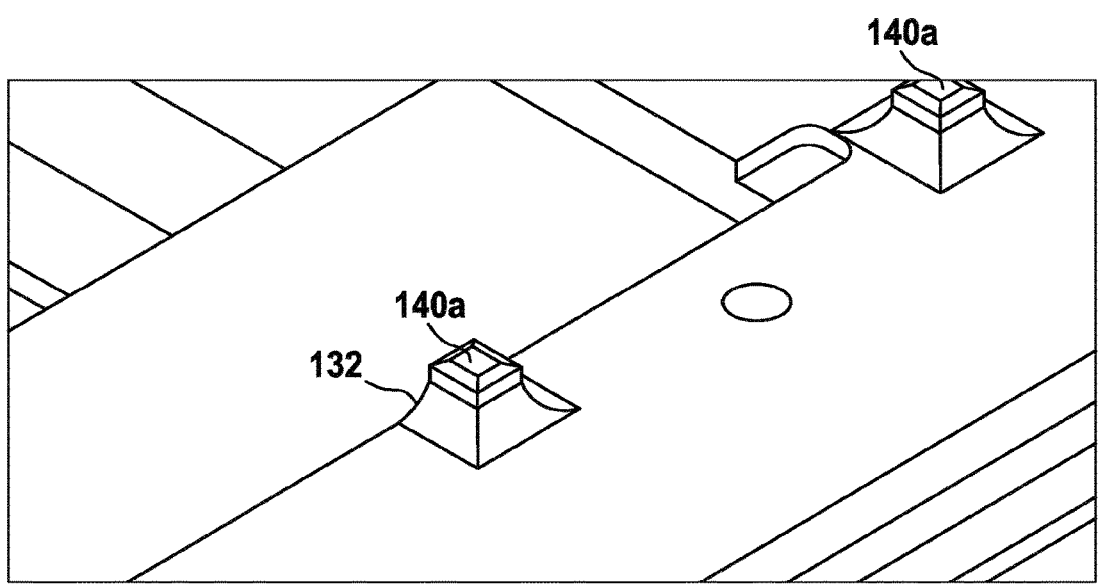
Figure 3E:
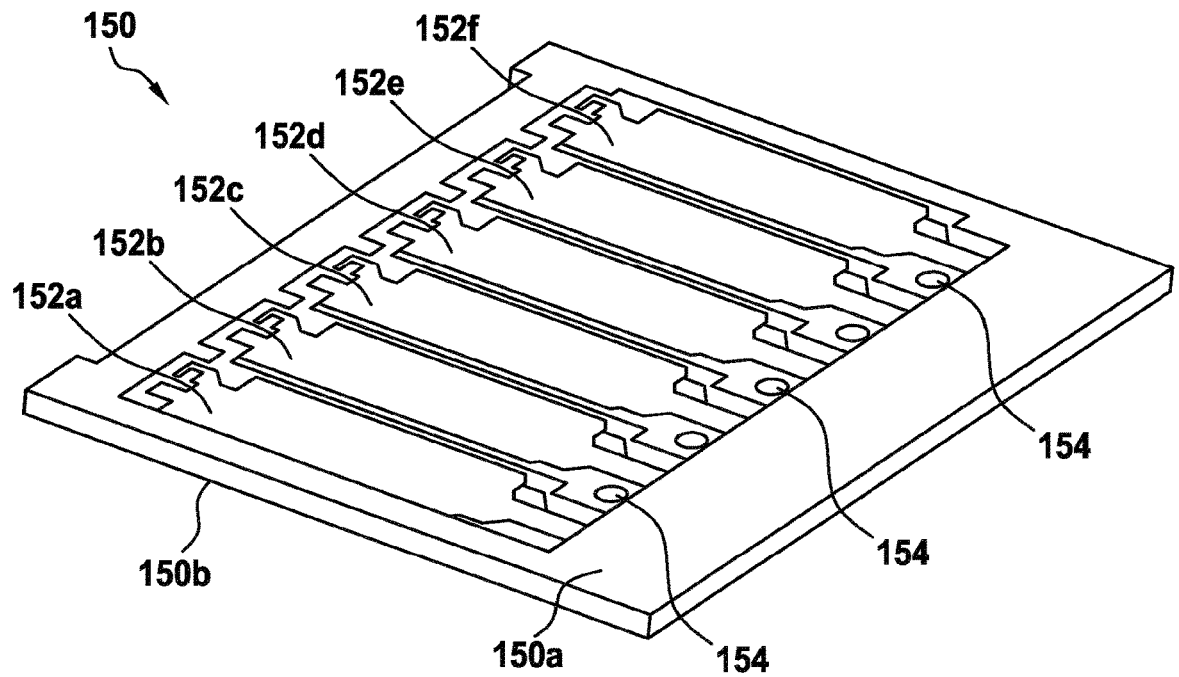
Figure 3F:
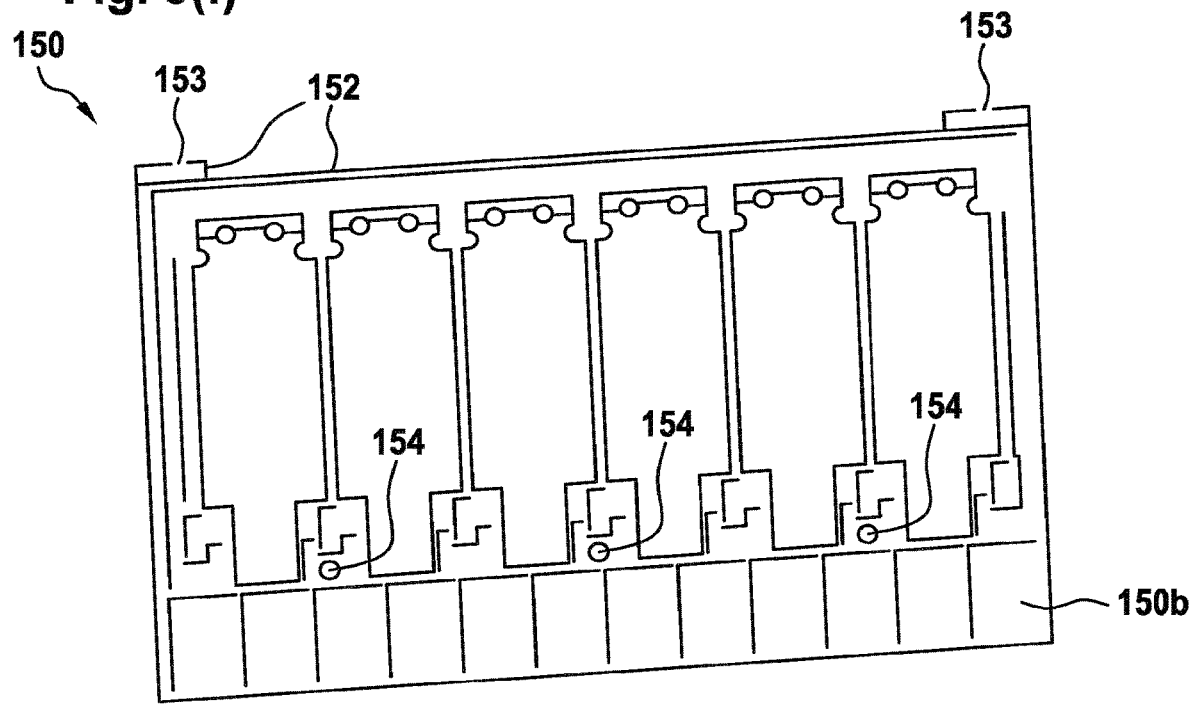
Figure 3G:
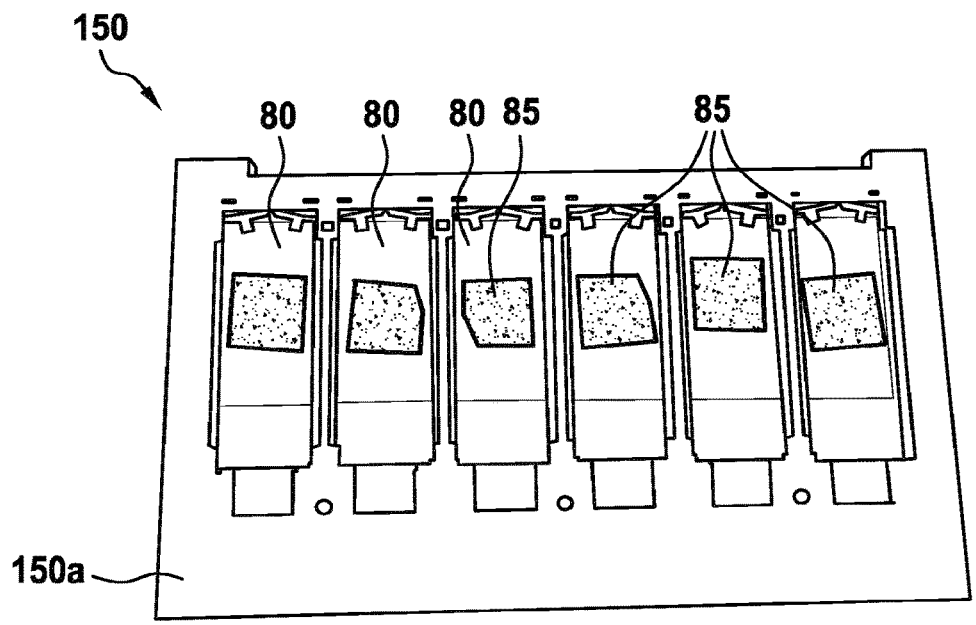

FIG. 3(g) shows slides 80 being held by the copy holder 150, wherein a respective sample 85 is mounted on each slide 80.

Figure 3H:
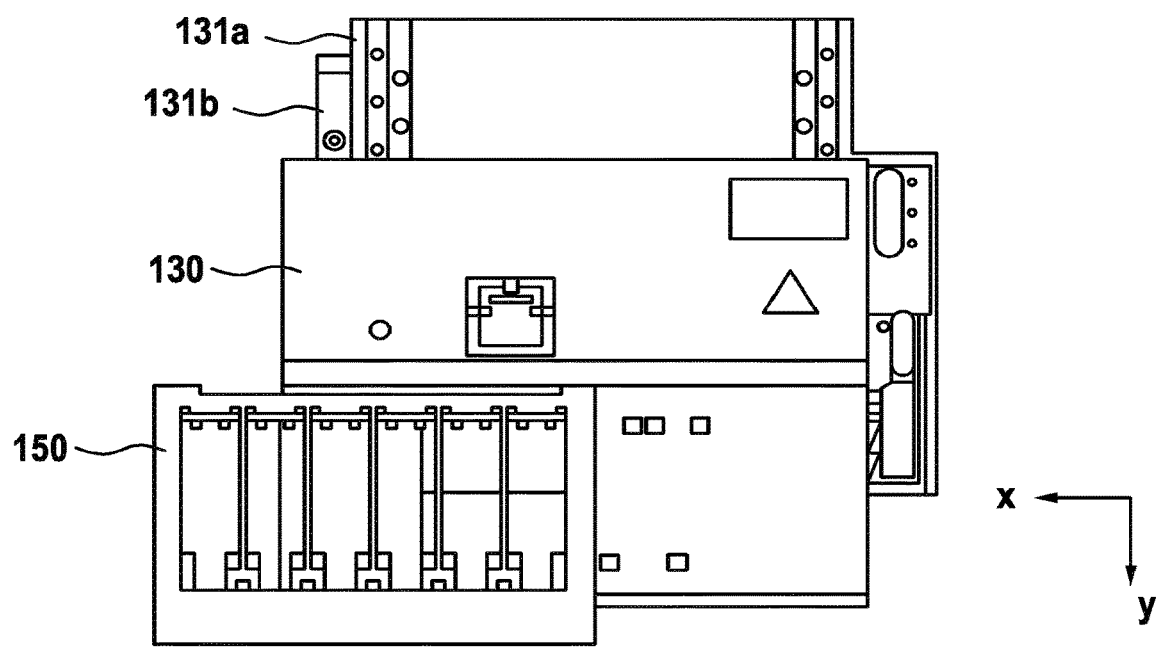

As shown e.g. in FIGS. 3(a) and 3(h), the movable stage 130 is the top plate in a three plate system that includes a middle plate 131a and a bottom plate 131b.

The copy holder moving system 120 includes a first motor (not shown) configured to move the movable stage 130 relative to the imaging system 110 along a first slide movement axis, referred to herein as a scan length axis (y-axis). In this example, the first motor is configured to move the movable stage 130 along the scan length axis by driving a first movement mechanism (not shown) The copy holder moving system 120 includes a second motor (not shown) configured to move the movable stage 130 relative to the imaging system 110 along a second slide movement axis, referred to herein as a swathe width axis (x-axis). In this example, the second motor is configured to move the middle plate 131a and as such the moveable stage 130 along the swathe width axis (x-axis) by driving a second movement mechanism (not shown).

In this example, the bottom plate 131b does not move relative to the imaging system 110.

The first and second movement mechanism (and indeed the third movement mechanism discussed below) may each respectively include, for example, a leadscrew, a linear motor system or a piezo drive. Of course, other movement mechanisms for providing such relative movement between the movable stage 130 and the imaging system 110 could equally be envisaged.

As shown e.g. in FIG. 3(a), a top surface 130a of the movable stage 130 includes a plurality of slide support pins 132.

As shown e.g. in FIG. 3(b), the slide support pins 132 of this example include the following groups of slide support pins 132:

a first group of three slide support pins 132a for supporting a slide held by the copy holder 150 in a first non-imaging location on the movable stage a second group of three slide support pins 132b for supporting a slide held by the copy holder 150 in a second non-imaging location on the movable stage a third group of three slide support pins 132c for supporting a slide held by the copy holder 150 in a first imaging location on the movable stage a fourth group of three slide support pins 132d for supporting a slide held by the copy holder 150 in a second imaging location on the movable stage a fifth group of three slide support pins 132e for supporting a slide held by the copy holder 150 in a third non-imaging location on the movable stage a sixth group of three slide support pins 132f for supporting a slide held by the copy holder 150 in a fourth non-imaging location on the movable stage The slide support pins 132 are therefore configured to support one or more slides 80 in two imaging locations on the movable stage 130, wherein the imaging system 110 is configured to form an image of a sample mounted on a slide 80 located in each imaging location on the movable stage 130 during an image forming process that involves the movable stage 130 moving relative to the imaging system 110 along the scan length and swathe width axes. This image forming process is described in more detail below.

The imaging system 110 is not configured to form an image of a sample mounted on a slide 80 located in any of the non-imaging locations on the movable stage 130. This allows the slide imaging apparatus 100 to be made more compact, since the imaging locations are close to each other and fall within a small surface area of the movable stage 130 so can be imaged with a smaller range of movement of the movable stage 130.

At least the slide support pins for supporting slides 80 in the imaging locations (i.e. the slide support pins 132c-d in the third and fourth groups) preferably have coplanar top surfaces 140a for supporting slides 80, so that the imaging system 110 is able to more easily retain focus of samples mounted on slides 80 supported by the slide support pins 132c-d whilst it is moved by the moveable stage 130 during an image forming process as described below.

The slide support pins 132a-b, 132e-f for supporting slides in the non-imaging locations may also have coplanar top surfaces 140a for supporting slides 80, though this is less important, since as noted above the imaging system is not configured to form an image of a sample mounted on a slide 80 located in any of the non-imaging locations.

The top surface 130a of the movable stage 130 is not flat, and includes a step at one end which forms a ledge 133 having a top surface 133a.

Each of these groups of the slide support pins 132a-132f is arranged with a single pin for supporting one end of a slide 80 and a pair of pins for supporting an opposite end of the same slide 80.

Each of the six groups of the slide support pins 132a-132f as defined above is configured to support a typical pathology slide, which may have a length and width dimensions of 75 mm by 25 mm (3 by 1 inches).

In addition to the six groups defined to above, the slide support pins 132 also include a seventh group of slide support pins that includes a large slide support pin 132g and the single pins from the third and fourth groups of slide support pins 132c-d.

The large slide support pin 132g is slightly taller than the slide support pins in the first-sixth groups of slide support pins 132a-132f. This allows a large slide having a width dimension that is larger than a typical pathology slide to be supported by the seventh group of slide support pins, if a copy holder able to hold a large slide is used in place of the copy holder 150 shown in FIGS. 3(e)-(f).

Although a large slide supported by the seventh group of slide support pins would be inclined at an angle to a typical pathology slide supported by one of the six groups defined above (due to the slide support pin 132g being taller), it would be straight forward for the imaging system 110 to incline its imaging plane accordingly so that it can form an image of a sample mounted on the large slide. Such techniques are known in the art.

The top surface 130a of the movable stage 130 includes indexing formations, which in this example have the form of indexing pins 134. The function of these indexing formations is described in more detail below.

FIGS. 3(e) and 3(f) show the copy holder 150 in further detail.

FIG. 3(e) shows the copy holder 150 with a top surface 150a facing upwards and a bottom surface 150b facing downwards. FIG. 3(f) shows the copy holder 150 with the bottom surface 150b facing upwards.

The copy holder 150 includes six apertures having the form of slots 152a-152f, each slot 152a-f being configured to loosely hold a respective slide such that a slide is able to rest in each of the slots 152a-f when the top surface 150a is facing upwards but will fall out if the bottom surface 150b is facing upwards.

FIG. 3(g) shows the copy holder 150 with a slide 80 loosely held in each aperture of the copy holder 150.

The copy holder 150 is configured to be mounted to the movable stage 130 in each of three indexing positions that include:
- a first indexing position in which a first subset of two slides held by the first and second apertures 152a-b of the copy holder 150 are supported in the first and second imaging positions by the slide support pins 132c-132d
- a second indexing position in which a second subset of two slides held by the third and fourth apertures 152c-d of the copy holder 150 are supported in the first and second imaging positions by the slide support pins 132c-132d
- a third indexing position in which a third subset of two slides held by the fourth and fifth apertures 152e-f of the copy holder 150 are supported in the first and second imaging positions by the slide support pins 132c-132d The copy holder 150 includes indexing formations, which in this example have the form of indexing holes 154 extending from the top surface 150a to the bottom surface 150b of the copy holder 150. The indexing pins 134 on the movable stage 130 are configured to cooperate with (by extending into) the indexing holes 154 so as to act to fix the position of the copy holder 150 relative to the movable stage 130 when the copy holder 150 is mounted to the movable stage 130 in each of the first-third indexing positions.

FIG. 3(h) shows the copy holder 150 mounted to the third indexing position.

The copy holder 150 may be mounted to the movable stage 130 in any of the first-third indexing positions e.g. by a user manually placing the copy holder 150 on the movable stage 130 in the relevant indexing position.

The copy holder 150 may be unmounted from any of the first-third indexing positions on the movable stage 130 e.g. by a user manually removing the copy holder 150 from the movable stage 130.

The imaging system 110 is configured to form an image of a sample mounted on a slide 80 located in each imaging location on the movable stage 130 during an image forming process that includes the movable stage 130 moving relative to the imaging system 110 along the scan length axis (y-axis) and swathe width axis (x-axis).

The image forming process may be performed with a plurality of slides 80 being held by the slots 152a-f of the copy holder 150 and the copy holder 150 mounted to the movable stage 130 in one of the first-third indexing positions.

During the image forming process, the imaging system 110 may form a respective image of a respective sample mounted on each slide 80 in the first and second imaging locations. If the imaging system 10 is used as the imaging system 110 in the slide imaging apparatus 100, then each image may be formed plurality of swathes, wherein each swathe is formed by a group of scan lines, each scan line being acquired using the scan line detector 14 from a respective elongate region 82 on the surface of the sample that extends along the swathe width axis (x-axis), wherein each group of scan lines is acquired whilst the slide 80 is moved relative to the scan line detector 14 along the scan length axis (y-axis), e.g. in the direction labelled 16 in FIG. 1(a), using the copy holder moving system 120. After one swathe has been acquired, the slide 80 may be moved along the swathe width axis (x-axis), e.g. in the direction labelled 15 in FIG. 1(a), to allow a further swathe to be acquired by moving the slide 80 along the scan length axis (y-axis). This further swathe may be acquired by moving the slide 80 along the scan length axis in a direction opposite to the direction labelled 16 in FIG. 1(a), e.g. such that the slide 80 is moved along a serpentine path during the image forming process.

A focus setting of the imaging system 10 of FIG. 1(a) may be adjusted during the image forming process and even during the acquisition of an individual swathe, for example, by moving the imaging lens 12 along an imaging axis 13. Techniques for measuring and dynamically adjusting focus to maintain the sample in focus along the length of the sample as the slide 80 is moved along the scan length axis are described in the literature, see e.g. U.S. Pat. No. 7,485,834, WO2013/017855 and US2014/0071438.

Figure 4A:
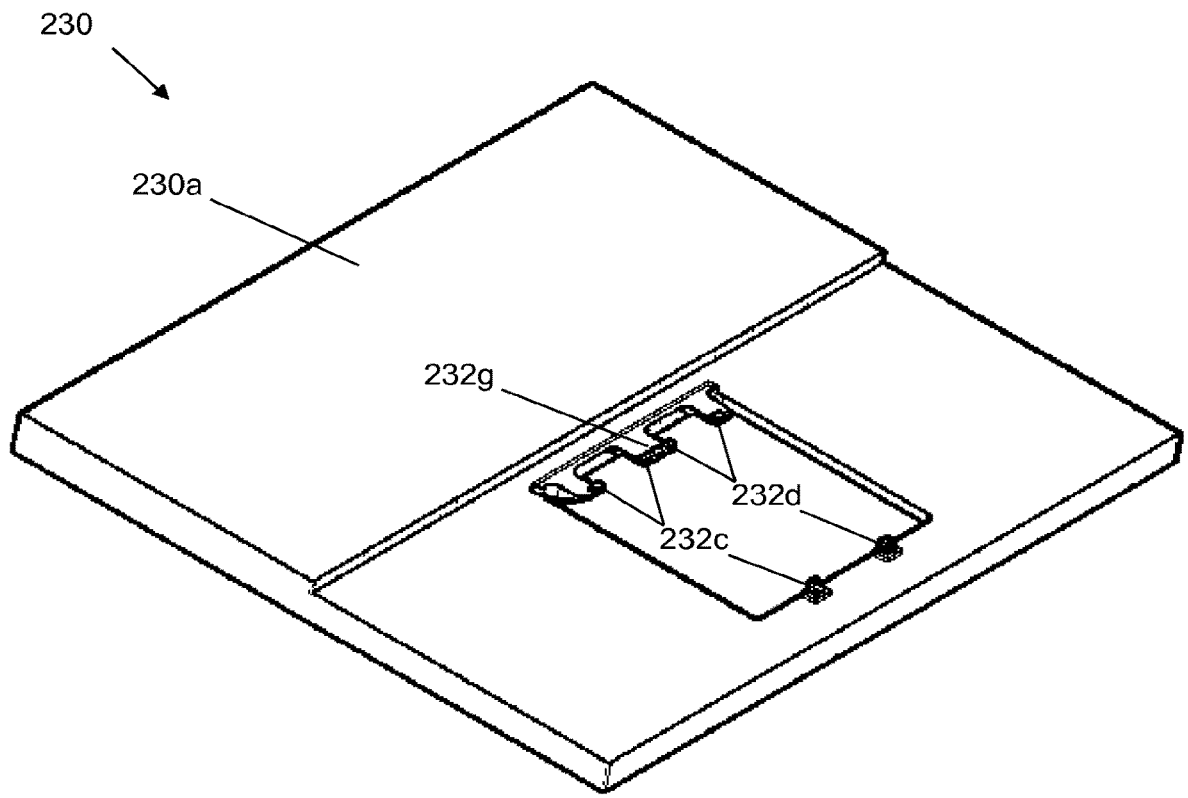
FIGS. 4(a) and 4(b) show a movable stage for use as the movable stage in the slide imaging apparatus of FIG. 2.
Figure 4B:
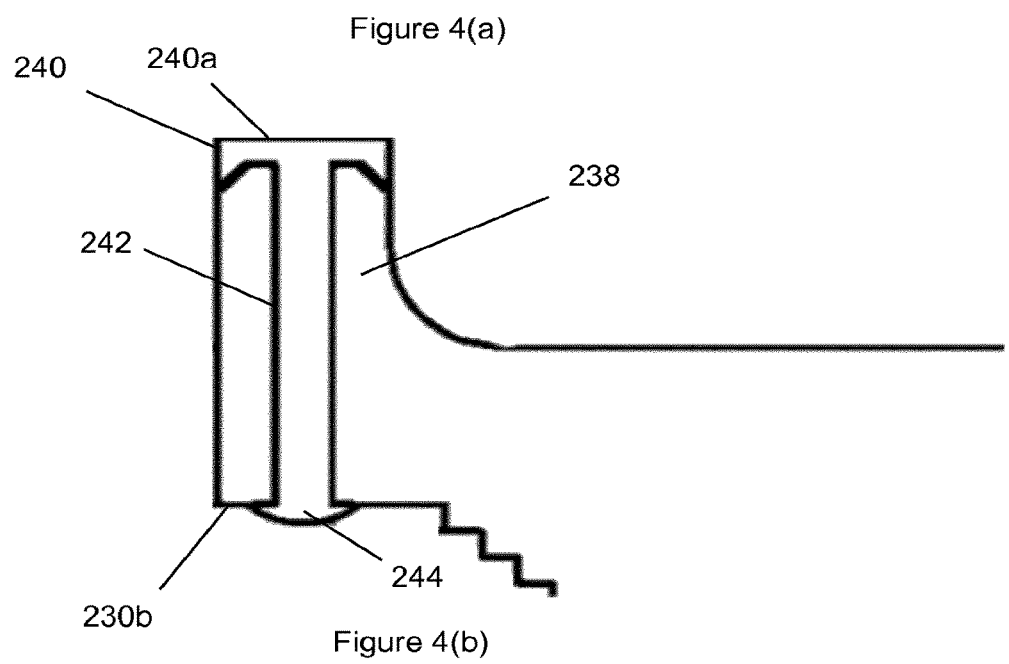

FIGS. 4(a) and 4(b) show a movable stage 230 made in accordance with the present invention, suitable for use as the movable stage in the slide imaging apparatus 100 of FIG. 2.

Features of the movable stage 230 of FIGS. 4(a) and 4(b) which correspond to features of the movable stage 130 of FIGS. 2 and 3 have been labelled with corresponding reference numerals and can be assumed to be the same or equivalent unless otherwise stated.

Some features of the movable stage 230 of FIGS. 4(a) and 4(b) have been simplified/omitted for clarity. For example, for clarity, the first, second, fifth and sixth groups of slide support pins of the movable stage 230 are not shown in FIG. 4(a).

A key difference between the movable stage 230 of FIGS. 4(a) and 4(b) and the movable stage 130 FIGS. 2 and 3 is that the third and fourth groups of slide support pins 232c, 232d each include a respective tip 240 of solid pin surfacing material. The tips 240 have coplanar top surfaces 240a for supporting one or more slides 80.

The first, second, fifth and sixth groups of slide support pins of the movable stage 230 might, for convenience, also include a respective tip of solid pin surfacing material, but this need not be the case since these groups of slide support pins are only used to support slides in non-imaging locations on the movable stage 230, so it is not as important for the top surfaces of these slide support pins to be coplanar.

The structure of one of the slide support pins 232 that includes a tip 240 of solid pin surfacing material is shown in more detail in FIG. 4(b).

As can be seen from FIG. 4(b), the slide support pin 232 includes a slide support pin base 238, and a tip 240 of solid pin surfacing material.

The tip 240 is part of a contiguous element of solid pin surfacing material that also forms a core 242 and an optional securing element 244 of the slide support pin 232.

The core 242 fills a hole in the slide support pin base 238, wherein the hole extends from a top surface of the slide support pin base 238 through to the bottom surface 230b of the movable stage 230.

The optional securing element 244 of solid pin surfacing material overlaps an outer edge of the hole in the slide support pin base at the bottom surface 230b of the stage 230. The securing element 244 acts to hold the tip 240 in place at the top surface of the slide support pin base 238.

FIGS. 5(a)-(e) show a method of preparing the movable stage shown in FIGS. 4(a) and 4(b) for use in a slide imaging apparatus.

Again, for clarity, the first, second, fifth and sixth groups of slide support pins of the movable stage 230 are not shown in FIGS. 5(a)-(e).

FIGS. 5(a)-(g) show the movable stage 230 having a top surface 230a and a bottom surface 230b, wherein the top surface 230a of the stage includes a plurality of slide support pin bases 238, and wherein each slide support pin base 238 includes a respective hole 239 that extends from a top surface 238a of the slide support pin base 238 through to the bottom surface 230b of the movable stage 230.

Figure 5A:
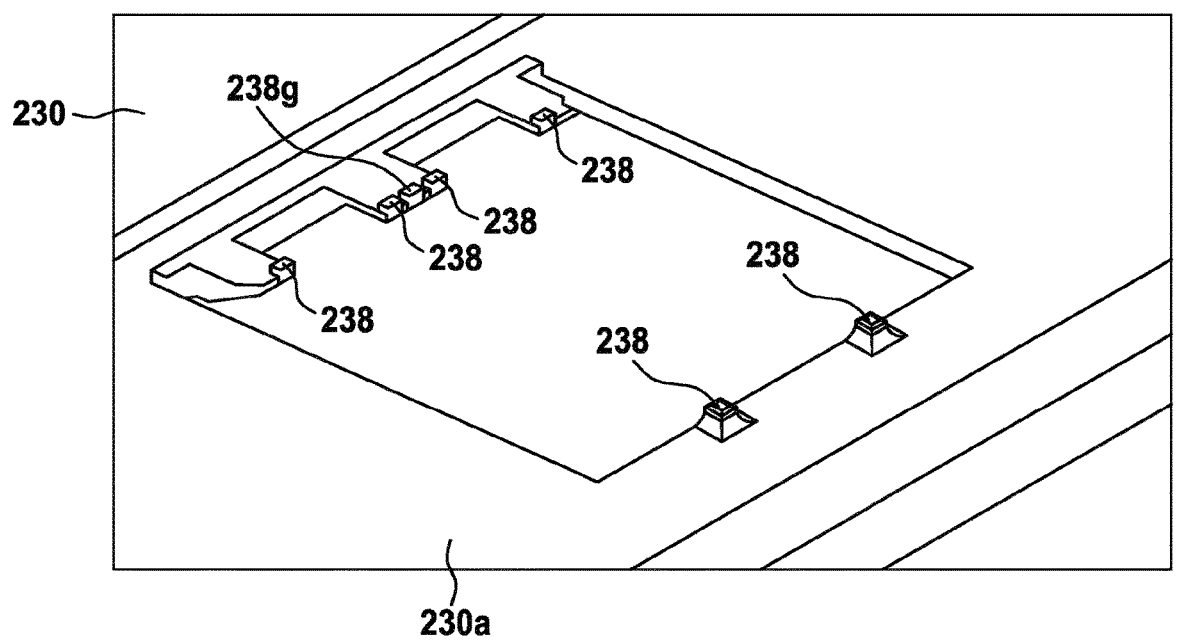
FIGS. 5(a)-(h) show a method of preparing the movable stage shown in FIG. 4 for use in a slide imaging apparatus.
Figure 5B:
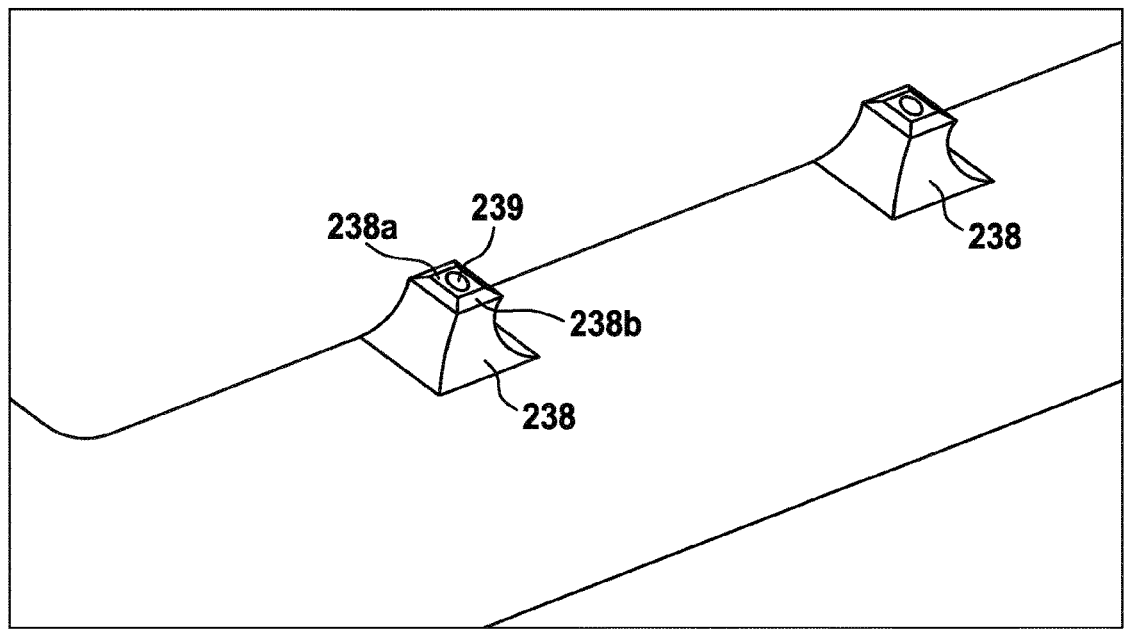

The movable stage 230 as shown in FIGS. 5(a) and 5(b) (i.e. with the solid surfacing material not yet present) may be integrally formed from a metal, such as aluminium or steel. The holes 239 in the slide support pin bases 238 may be formed by drilling.

The slide support pin bases 238 as shown in FIGS. 5(a) and 5(b) have positions that correspond to the positions of the third and fourth groups of slide support pins 232c, 232d of the movable stage 230 of FIGS. 4(a) and 4(b).

Each slide support pin base 238 includes a bevelled edge 238b around its top surface 238a.

Figure 5C:
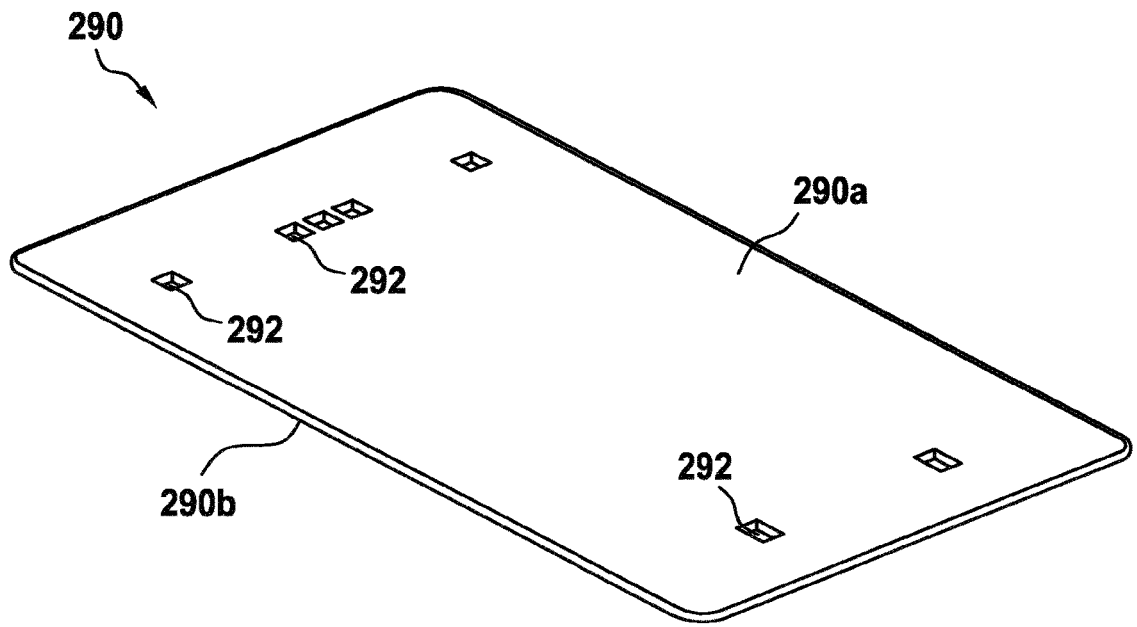

FIG. 5(c) shows a pin tip forming tool 290 that has a plurality of apertures 292, with each aperture 292 in the pin tip forming tool 290 being configured (e.g. by being appropriately located and shaped) to confine fluid pin surfacing material exiting the hole 239 at the top surface 238a of a respective slide support pin base 238. In other words, the relative positions of the apertures 292 on the pin tip forming tool 290 match the relative locations of the slide support pin bases 238 on the movable stage 230.

Figure 5D:
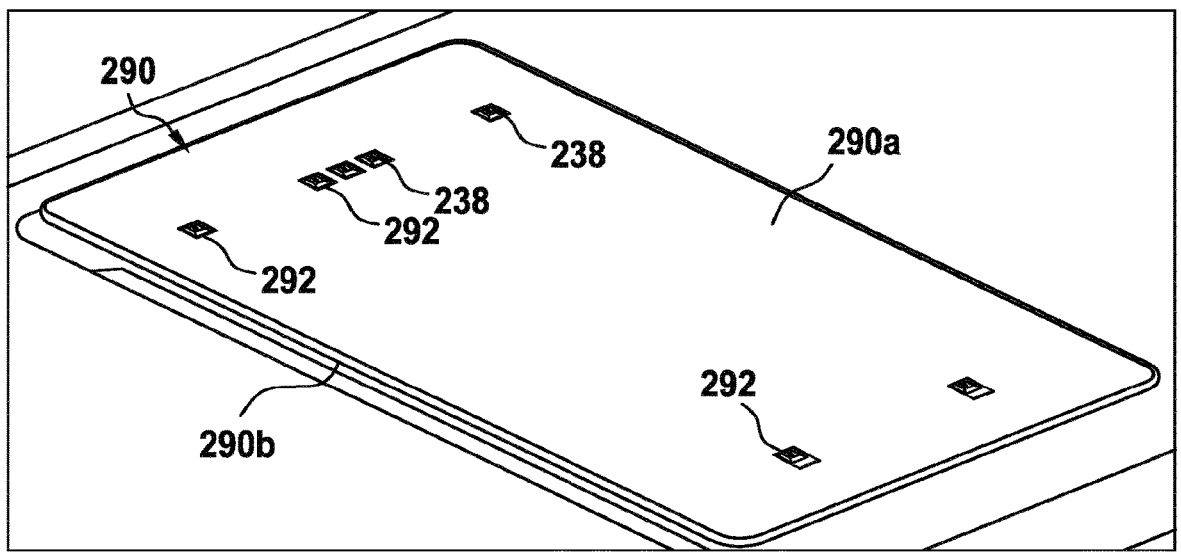

As shown in FIG. 5(d), the pin tip forming tool 290 is mounted on the slide support pin bases 238 so that each aperture 292 of the pin tip forming tool 290 is aligned with a respective slide support pin base 238.

The apertures 292 in the pin tip forming tool 290 may be sized so that a bottom surface 290b of the pin tip forming tool 290 sits on the bevelled edges 238b of the slide support pin bases 238 when the pin tip forming tool 290 is mounted on the slide support pin bases 238, as shown in FIG. 5(d).

Figure 5E:
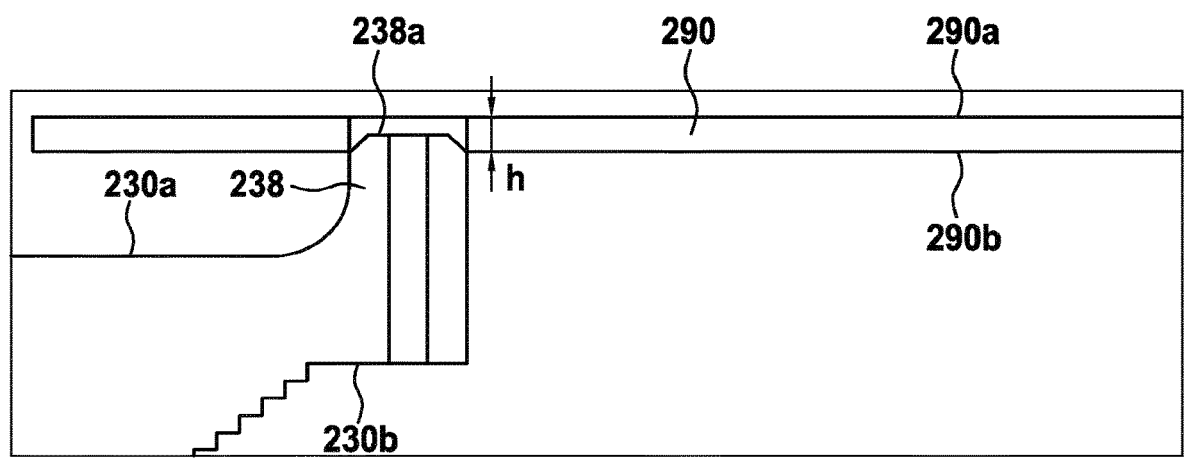

The pin tip forming tool 290 may have a top surface 290a configured to be positioned at a predetermined height h above a top surface 238a of each slide support pin base 238 when the pin tip forming tool 290 is mounted on the slide support pin bases 238, as shown in FIG. 5(e).

Figure 5F:
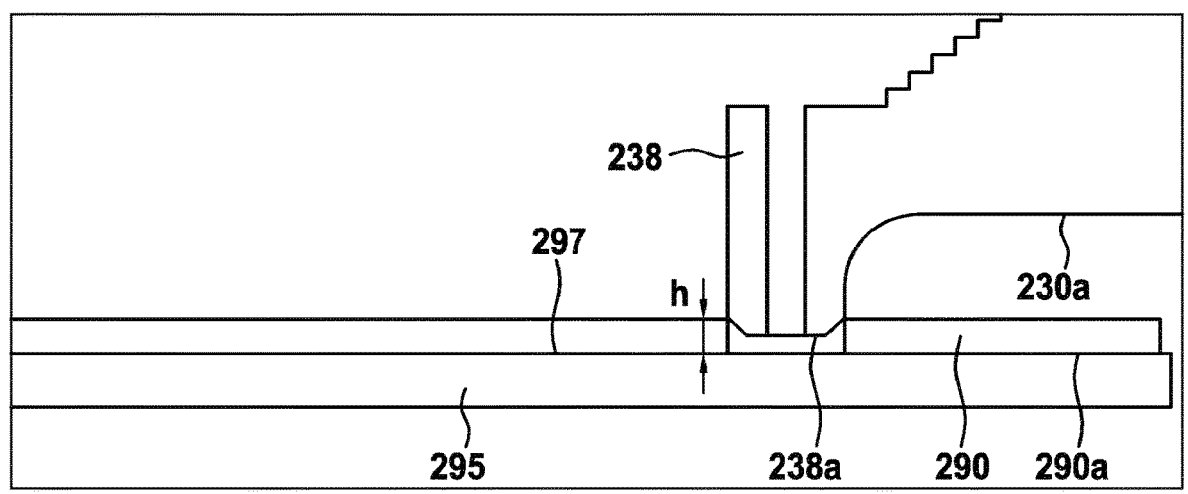

Next, with the movable stage 230 with the pin tip forming tool 290 mounted on the slide support pin bases 238 is turned upside down with the top surface 290a of the pin tip forming tool 290 placed against a flat surface 297, so that the pin tip forming tool 290 is located between the top surface 230a of the movable stage 230 and the flat surface 297, as shown in FIG. 5(f).

For the slide support pin bases 238, the flat surface 297 is thereby positioned in front of the top surfaces 238a of the slide support pin bases 238, with a predetermined gap h between the top surface 238a of each slide support pin base 238 and the flat surface 297.

The flat surface 297 may be provided by a surface plate 295, which could be made e.g. from tool steel. The flat surface 297 may be covered with a suitable release agent, at least in positions corresponding to the slide support pin bases 238.

Next, for each slide support pin base 238, a fluid pin surfacing material configured to solidify is injected into the hole 239 of the slide support pin base 238 from the bottom surface 230b of the movable stage 230 so that at least some of the fluid pin surfacing material exits the hole at the top surface 238a of the slide support pin base 238 and pushes up against the flat surface 297.

During injection of the fluid pin surfacing material into the hole 239 of each slide support pin base 238, some fluid pin surfacing material 243 may be left to overlap an outer edge of the hole 239 in the slide support pin base 238 at the bottom surface 230b of the movable stage 230. After curing of the fluid pin surfacing material 243 (discussed below), this overlapping material forms the securing element 244 as shown in FIG. 4(b).

Next, in a curing step, the fluid pin surfacing material 243 solidifies into the solid pin surfacing material. The curing step may include simply waiting for the fluid pin surfacing material 243 to harden, or may include some action to promote or cause solidification of the fluid pin surfacing material 243. This action may include heating, for example.

Figure 5G:
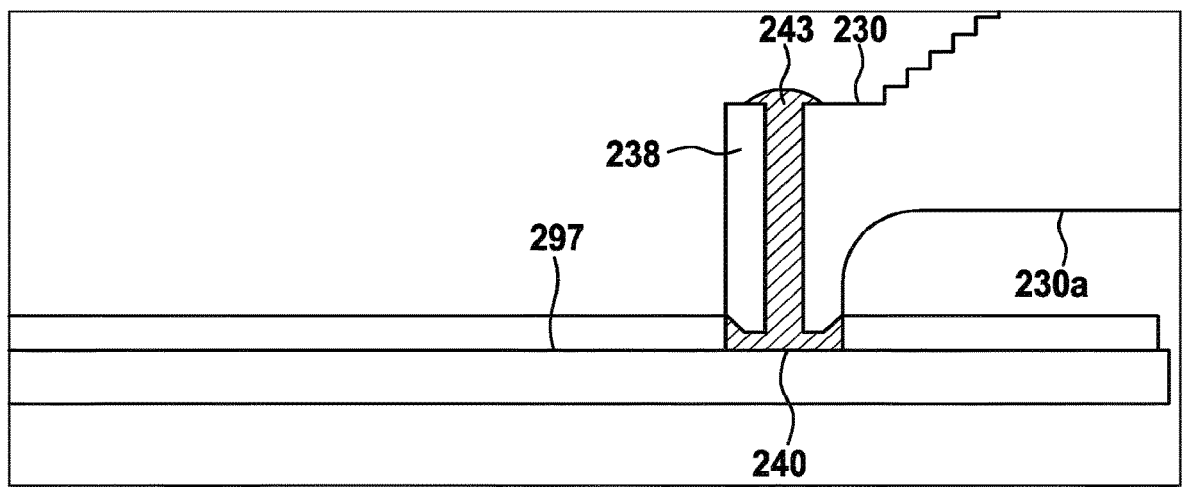
Figure 5H:
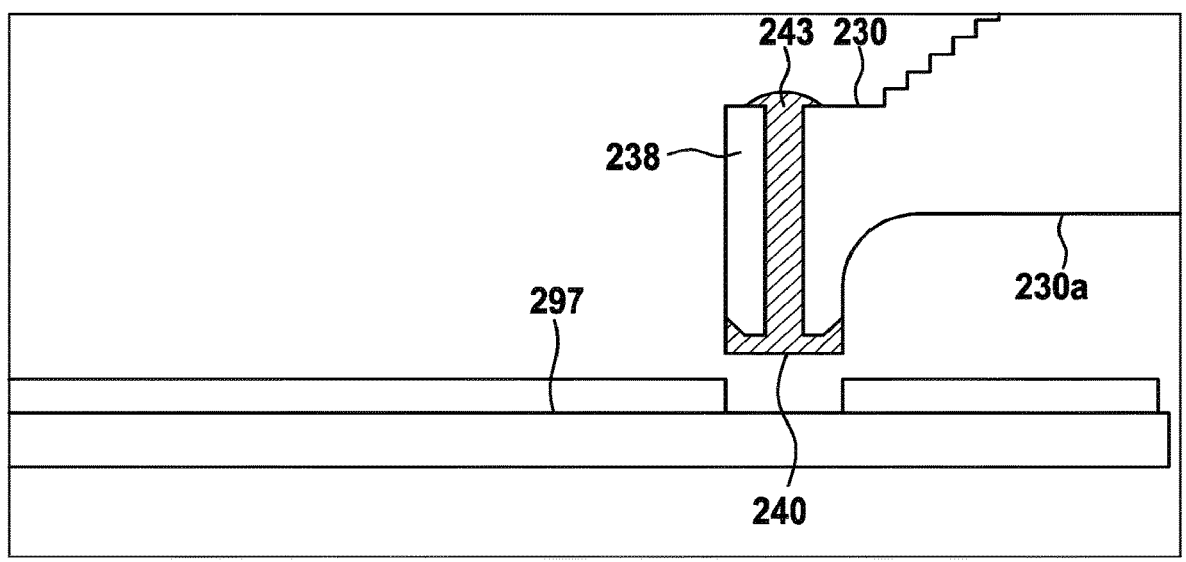

After the fluid pin surfacing material 243 injected into the hole 239 of each slide support pin base 238 has solidified as in FIG. 5(g), the flat surface 297 and the pin forming tool 290 are removed as shown in FIG. 5(h) so that a tip 240 of solid pin surfacing material is formed on the top surface 238a of each slide support pin base 238, thereby providing the movable stage 230 with a plurality of slide support pins 232, each slide support pin including a respective slide support pin base 238, a tip 240 of solid pin surfacing material, a core 242 and a securing element 244, as shown in FIG. 4(b).

In this way, the tips of the third and fourth groups of the slide support pins 232c-d are able to have coplanar top surfaces 240a configured to support one or more slides.

The solidified fluid pin surfacing material preferably has qualities (coefficient of friction relative to glass, an elastic modulus) as described above, and may, for example, be a replicating material such as an epoxy resin. Resins having such qualities are well known in the art.

In this way, the tips of the slide support pins 232 can be provided with a material that provides enhanced friction with glass compared with metal slide support pins 32 as described in the background section, above. Thus, the movable stage 230 can be moved faster without a slide resting on the slide support pins 232 slipping, compared with metal slide support pins 32. This allows for images of samples mounted on the slides to be formed faster.

As illustrated in FIG. 4(a), the movable stage 230 may also have a large slide support pin 232g that is slightly taller than the third and fourth groups of slide support pins 232c-d.

The movable stage 230 may therefore include slide support pin base 238g that has a hole that extends from a top surface of the slide support pin base 238g to the bottom surface 230b of the movable stage 230, and a position that corresponds to the position of the large slide support pin 232g, as shown in FIG. 5(a).

Since the height of the large slide support pin 232g is to be different from the height of the third and fourth groups of slide support pins 238c-d, the slide support pin base 238g may have a different height to the other slide support pin bases 238. The corresponding aperture 292 in the pin tip forming tool 290 may therefore be sized to accommodate this, and the top surface 290a of the pin tip forming tool 290 may therefore be configured to be positioned at a different predetermined height h1 (not illustrated) above a top surface of the slide support pin base 238g.

Similarly, the surface plate 295 may include a recess having a secondary flat surface in a position corresponding to the slide support pin base 238g.

The fluid pin surfacing material may be injected into the hole 239 of the slide support pin base 238g from the bottom surface 230b of the movable stage 230 at the same time as the other slide support pin bases 238g so that at least some of the fluid pin surfacing material exits the hole at the top surface of the slide support pin base 238g and pushes up against the secondary flat surface. Thus, after the fluid pin surfacing material injected into the hole of the slide support pin base 238g has solidified and the flat surface 297 and the pin forming tool 290 have been removed, the resulting tip 240 of the slide support pin 232g has a top surface 238a having a different height from the third and fourth groups of slide support pins 232c-d.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The invention claimed is:

1. A slide-imaging apparatus comprising:
an imaging system comprising:
a camera for capturing an image of a slide comprising a biological sample; and
an imaging lens for focusing light reflected from at least part of the biological sample onto the camera; and
a copy-holder moving system comprising:
a copy holder comprising:
one or more apertures for holding a set of slides; and
one or more indexing holes; and
a movable stage comprising:
one or more indexing pins, wherein the copy holder is configured to be mounted on the movable stage by aligning each of the one or more indexing holes to a corresponding indexing pin of the one or more indexing pins;
a plurality of slide support pins formed on a surface of the movable stage, wherein each slide support pin of the plurality of slide support pins includes a respective tip formed with a solid pin surfacing material, and wherein the plurality of slide support pins is configured to contact and secure the set of slides held by the one or more apertures as the copy holder is mounted on the movable stage; and
an imaging area at which the camera is configured to capture an image of a slide of the set of slides that is positioned over the imaging area after the copy holder is mounted on the movable stage.

2. The slide-imaging apparatus of claim 1, wherein the copy-holder moving system further includes a first motor, wherein the movable stage is coupled to the first motor for moving the movable stage along a scan length of a slide of the set of slides.

3. The slide-imaging apparatus of claim 2, wherein the first motor includes a leadscrew, a linear motor, and/or a piezo driver.

4. The slide-imaging apparatus of claim 1, wherein the copy-holder moving system further includes a second motor, wherein the movable stage is coupled to the second motor for moving the movable stage along a swathe width of a slide of the set of slides.

5. The slide-imaging apparatus of claim 1, wherein the copy-holder moving system further includes a top plate and a bottom plate, wherein the movable stage corresponds to the top plate.

6. The slide-imaging apparatus of claim 1, wherein the solid pin surfacing material has a coefficient of static friction relative to glass of 0.2 or higher.

7. The slide-imaging apparatus of claim 1, wherein the solid pin surfacing material includes epoxy resin.

8. The slide-imaging apparatus of claim 1, wherein the solid pin surfacing material has a hardness between 60 and 80 on a Shore A hardness scale.

9. A copy holder moving system comprising:
a copy holder comprising: (i) one or more apertures for holding a set of slides; and (ii) one or more indexing holes; and
a movable stage comprising:
one or more indexing pins, wherein the copy holder is configured to be mounted on the movable stage by aligning each of the one or more indexing holes to a corresponding indexing pin of the one or more indexing pins;
a plurality of slide support pins, wherein each slide support pin of the plurality of slide support pins includes a respective tip formed with a solid pin surfacing material, and wherein the plurality of slide support pins are configured to contact and secure the set of slides held by the one or more apertures as the copy holder is mounted on the movable stage; and an imaging area at which a camera of a slide-imaging apparatus is configured to capture an image of a slide of the set of slides that is positioned over the imaging area after the copy holder is mounted on the movable stage.

10. The copy holder moving system of claim 9, further comprising a first motor, wherein the movable stage is coupled to the first motor for moving the movable stage along a scan length of a slide of the set of slides.

11. The copy holder moving system of claim 9, further comprising a second motor, wherein the movable stage is coupled to the second motor for moving the movable stage along a swathe width of a slide of the set of slides.

12. The copy holder moving system of claim 9, wherein respective tips of the plurality of slide support pins form a coplanar surface.

13. The copy holder moving system of claim 9, wherein the solid pin surfacing material has a coefficient of static friction relative to glass of 0.2 or higher.

14. The copy holder moving system of claim 9, wherein the solid pin surfacing material includes epoxy resin.

15. The copy holder moving system of claim 9, wherein the solid pin surfacing material has a hardness between 60 and 80 on a Shore A hardness scale.

16. The copy holder moving system of claim 9, wherein a first set of slide support pins of the plurality of slide support pins have a different length from a second set of slide support pins of the plurality of slide support pins.

17. The copy holder moving system of claim 9, wherein each slide support pin of the plurality of slide support pins further includes a slide support pin base, wherein the respective tip is located on top of the slide support pin base.

18. The copy holder moving system of claim 17, wherein the respective tip further includes additional solid pin surfacing material extending through a hole within the slide support pin base.

19. A method comprising:
obtaining a first slide of a first biological sample and a second slide of a second biological sample;
inserting the first slide and the second slide on a copy holder comprising one or more apertures, wherein the first slide is inserted into a first aperture of the one or more apertures and the second slide is inserted into a second aperture of the one or more apertures;
mounting the copy holder on a movable stage of a slide-imaging apparatus at a first indexing position, wherein:
(i) the movable stage includes a plurality of slide support pins configured to secure the first slide and the second slide as the copy holder is mounted on the movable stage, wherein each slide support pin of the plurality of slide support pins includes a respective tip formed with solid pin surfacing material; and
(ii) the first indexing position allows the first slide to be positioned over an imaging area of the movable stage and the second slide to be positioned over an area outside of the imaging area;
capturing, using the slide-imaging apparatus, a first image of the first slide;
mounting the copy holder on the movable stage at a second indexing position, wherein the second indexing position allows the second slide to be positioned over the imaging area of the movable stage and the first slide to be positioned over the area outside of the imaging area; and
capturing, using the slide-imaging apparatus, a second image of the second slide.

* * * * *